Patented Sept. 15, 1942

2,296,211

UNITED STATES PATENT OFFICE 2,296,211

PRODUCTION OF NITROGENEOUS CONDENSATION PRODUCTS

Hans Krzikalla and Richard Armbruster, Ludwigshafen-on-the-Rhine, Germany, assignors, by mesne assignments, to General Aniline & Film Corporation, New York, N. Y., a corporation of Delaware No Drawing. Application January 12, 1939, Serial No. 250,572. In Germany January 20, 1938

8 Claims. (Cl. 260—598)

The present invention relates to new nitrogenous condensation products and a process of producing same.

It is already known that by reacting higher aldehydes with formaldehyde and salts of primary or secondary amines N-substituted β-aminoaldehydes may be obtained which under special conditions may be further condensed. Furthermore ketones have already been reacted with formaldehyde and amines or ammonium salts to form similar reaction products.

We have now found that very valuable nitrogenous condensation products are obtained by reacting ammonium salts simultaneously with formaldehyde and one or more other aldehydes. The salts of ammonia with hydrochloric acid, sulphuric acid, phosphoric acid, formic acid, acetic acid, benzene sulphonic acid, phthalic acid and the like may be used.

The formaldehyde may be used for example in aqueous solution; agents supplying formaldehyde may also be used, as for example hexamethylene tetramine, or paraformaldehyde. Among other aldehydes there may be mentioned for example acetaldehyde, crotonaldehyde, butyraldehyde, valeric aldehyde, isohexyl aldehyde and oleyl aldehyde. Several of these aldehydes may be employed instead of single aldehydes. The reaction conditions depend on the reactivity of the initial materials. Generally speaking the reaction may be carried out by gentle heating or boiling under reflux. It may be effected, however, also at lower temperatures. In some cases it is advantageous to work under pressure.

It is preferable to use from about 2 to about 3 molecular proportions of formaldehyde and about 1 molecular proportion of the other aldehydes for each molecular proportion of ammonium salt. The solution obtained may be neutralized with ammonia and then further condensation with fresh formaldehyde and other aldehydes may be effected.

The condensation products precipitate synthetic and natural tanning substances (including sulphite cellulose waste liquor) from their solutions. Acid dyestuffs are also precipitated thereby. The products are therefore eminently suitable as fixing agents for tanning agents and dyestuffs.

As compared with the known products from ketones, formaldehyde and amines or ammonium salts and with the known products from formaldehyde, higher aldehydes and salts of primary or secondary amines the new products are distinguished by a much higher precipitating capacity, especially towards acid dyestuffs so that dyeings obtained by means of acid dyestuffs and after-treated with the new products possess much better fastness properties, for example fastness to water and to boiling, than similar dyeings after-treated with the known products.

The following examples will further illustrate the nature of this invention but the invention is not restricted to these examples. The parts are by weight.

Example 1

53 parts of ammonium chloride, 230 parts of 40 per cent formaldehyde and 70 parts of crotonaldehyde are heated to boiling under reflux for 4 hours. A pale brown solution is obtained which may be used with advantage for fixing tanning agents or dyestuffs.

Example 2

53 parts of ammonium chloride or 66 parts of ammonium sulphate and 60 parts of formaldehyde (in the form of a 30 per cent solution) are heated to about 40° C. with 44 parts of acetaldehyde in an autoclave for about an hour while stirring. When the reaction which takes place with a rise of temperature to about 110° C. is concluded, a product is formed having properties similar to that obtainable according to Example 1. The product may be used directly or, for example when it is to be stored for a long time, evaporated to dryness, the said operation preferably being carried out in vacuo.

Larger amounts of formaldehyde, as for example 90 parts, may also be used, similar products being obtained.

Example 3

A mixture of 53 parts of ammonium chloride, 150 parts of 40 per cent aqueous formaldehyde solution and 60 parts of phenyl acetaldehyde is heated under reflux-cooling. The reaction sets in with strong boiling and the oily layer consisting of the phenyl acetaldehyde disappears. The product obtained possesses similar properties as the products formed according to the preceding examples.

If 3-phenyl-propionaldehyde or hexahydrobenzaldehyde are employed instead of phenyl acetaldehyde similar products are obtained.

What we claim is:

1. The process of producing nitrogenous condensation products, which comprises reacting an ammonium salt of a strong non-oxidizing acid with formaldehyde and at least one other aldehyde, 2. The process of producing nitrogenous condensation products, which comprises, reacting one molecular proportion of an ammonium salt of a strong non-oxidizing acid with from about 2 to about 3 molecular proportions of formaldehyde and about 1 molecular proportion of another aldehyde.

3. Condensation products from an ammonium salt of a strong non-oxidizing acid, formaldehyde and at least one other aldehyde.

4. Condensation products from 1 molecular proportion of an ammonium salt of a strong non-oxidizing acid, from about 2 to about 3 molecular proportions of formaldehyde and about 1 molecular proportion of another aldehyde.

5. Condensation products from an ammonium salt of a strong non-oxidizing acid, formaldehyde and another aliphatic aldehyde.

6. Condensation products from an ammonium salt of a strong non-oxidizing acid, formaldehyde and acetaldehyde.

7. Condensation products from an ammonium salt of a strong non-oxidizing acid, formaldehyde and crotonaldehyde.

8. Condensation products from an ammonium salt of a strong non-oxidizing acid, formaldehyde and phenyl acetaldehyde.

HANS KRZIKALLA.
RICHARD ARMBRUSTER.